US009393760B2

(12) United States Patent
He et al.

(10) Patent No.: US 9,393,760 B2
(45) Date of Patent: Jul. 19, 2016

(54) LAMINATED GLASS ARTICLES WITH PHASE-SEPARATED CLADDINGS AND METHODS FOR FORMING THE SAME

(71) Applicants: Mingqian He, Horseheads, NY (US); John Christopher Mauro, Corning, NY (US); Ronald John Parysek, Painted Post, NY (US); Natesan Venkataraman, Painted Post, NY (US)

(72) Inventors: Mingqian He, Horseheads, NY (US); John Christopher Mauro, Corning, NY (US); Ronald John Parysek, Painted Post, NY (US); Natesan Venkataraman, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 23 days.

(21) Appl. No.: 13/795,925

(22) Filed: Mar. 12, 2013

(65) Prior Publication Data
US 2014/0242375 A1    Aug. 28, 2014

Related U.S. Application Data

(60) Provisional application No. 61/770,447, filed on Feb. 28, 2013.

(51) Int. Cl.
*B32B 17/06* (2006.01)
*C03B 17/02* (2006.01)
*C03C 15/00* (2006.01)
(Continued)

(52) U.S. Cl.
CPC ............. *B32B 17/06* (2013.01); *C03B 17/02* (2013.01); *C03B 17/064* (2013.01); *C03C 3/091* (2013.01); *C03C 4/005* (2013.01); *C03C 11/005* (2013.01); *C03C 14/00* (2013.01); *C03C 15/00* (2013.01); *C03C 23/0095* (2013.01); *B32B 2307/418* (2013.01); *B32B 2307/42* (2013.01); *B32B 2307/716* (2013.01); *B32B 2551/00* (2013.01); *C03C 2214/30* (2013.01); *Y10T 428/249969* (2015.04); *Y10T 428/249994* (2015.04)

(58) Field of Classification Search
None
See application file for complete search history.

(56) References Cited

U.S. PATENT DOCUMENTS 2,106,744 A  2/1938  Hood et al. ................. 106/36.1
3,661,601 A  5/1972  Dumbaugh et al.
(Continued)

FOREIGN PATENT DOCUMENTS

GB  1457456  12/1976
GB  2075002  11/1981
(Continued)

OTHER PUBLICATIONS

Hawley's Condensed Chemical Dictionary, p. 590, 2007, no author.*
(Continued)

*Primary Examiner* — David Sample
(74) *Attorney, Agent, or Firm* — Michael A. Hood

(57) ABSTRACT

Laminated glass articles and methods for making the same are disclosed. In one embodiment, a laminated glass article may include a glass core layer and at least one glass cladding layer fused to the glass core layer. The at least one glass cladding layer may be phase separated into a first phase and at least one second phase having different compositions. The first phase of the at least one glass cladding layer may have an interconnected matrix. The at least one second phase of the at least one glass cladding layer may be dispersed throughout the interconnected matrix of the first phase of the at least one glass cladding layer. In some embodiments, the at least one second phase may be selectively removed from the interconnected matrix leaving a porous, interconnected matrix of the first phase.

20 Claims, 3 Drawing Sheets

(51) Int. Cl.
  *C03B 32/00* (2006.01)
  *C03C 3/091* (2006.01)
  *C03C 4/00* (2006.01)
  *C03C 11/00* (2006.01)
  *C03C 14/00* (2006.01)
  *C03C 23/00* (2006.01)
  *C03B 17/06* (2006.01)

(56) References Cited

U.S. PATENT DOCUMENTS

| | | |
|---|---|---|
| 3,737,294 A | 6/1973 | Dumbaugh |
| 3,746,526 A | 7/1973 | Giffon |
| 3,849,097 A | 11/1974 | Giffen |
| 3,931,438 A | 1/1976 | Beall et al. |
| 4,102,664 A | 7/1978 | Dumbaugh, Jr. |
| 4,214,886 A | 7/1980 | Shay et al. |
| 5,342,426 A | 8/1994 | Dumbaugh, Jr. |
| 5,559,060 A | 9/1996 | Dumbaugh, Jr. et al. |
| 7,201,965 B2 | 4/2007 | Gulati et al. |
| 7,514,149 B2 | 4/2009 | Bocko et al. |
| 8,007,913 B2 | 8/2011 | Coppola et al. |
| 2009/0192265 A1 | 7/2009 | Hasegawa et al. |
| 2010/0323204 A1 | 12/2010 | Tomozawa et al. |
| 2012/0196735 A1 | 8/2012 | Bogaerts et al. |
| 2013/0003096 A1 | 1/2013 | Zhang et al. |
| 2013/0157026 A1 * | 6/2013 | Kotani et al. ................ 428/215 |

FOREIGN PATENT DOCUMENTS

| | | | |
|---|---|---|---|
| WO | 03053873 | 7/2003 | |
| WO | WO 2008150355 A1 * | 12/2008 | ............. B32B 17/06 |
| WO | WO 2013/073131 A1 * | 5/2013 | |
| WO | 2013130668 | 6/2013 | |
| WO | 2013130718 | 9/2013 | |
| WO | DE 1022012218115 A1 * | 4/2014 | |

OTHER PUBLICATIONS

SCHOTT Technical Glasses Physical and technical properties, no Author, Mar. 2010.*

International Search Report, dated Jul. 22 2014, pp. 1-5, International Patent Application No. PCT/US2014/018492, European Patent Office, The Netherlands.

Written Opinion of the International Searching Authority, dated Jul. 22, 2014, pp. 1-6, International Patent Application No. PCT/US2014/018492, European Patent Office, The Netherlands.

Geohegan, et al., Surface directed spinodal decomposition in a partially miscible polymer blend, dated Aug. 5, 1995, pp. 2719-2724., J. Chem. Phys. 103 (7), 1.

E.A. Porai-Koshits et al., Primary and secondary phase separation of sodium silicate glasses, dated Jul. 4, 1968, pp. 30-38, J. Non-Cryst. Solids 1, 29.

Bio-Glasses: An Introduction, Jones, et al., eds., pp. i-235, John Wiley and Sons, Inc., 2012.

* cited by examiner

LAMINATED GLASS ARTICLES WITH PHASE-SEPARATED CLADDINGS AND METHODS FOR FORMING THE SAME

CROSS-REFERENCE TO RELATED APPLICATIONS

This application claims the benefit of priority under 35 U.S.C. §119 of U.S. Provisional Application Ser. No. 61/770,447, filed Feb. 28, 2013, the content of which is relied upon and incorporated herein by reference in its entirety.

BACKGROUND

1. Field

The present specification generally relates to laminated glass articles and, more specifically, to laminated glass articles having phase-separated claddings.

2. Technical Background

Glass has a number of attributes which make it desirable for use in a variety of commercial and consumer applications. For example, the optical properties of glass make it well suited for various optical applications such as filters or the like. Similarly, the relative chemical inertness of glass also makes glass an attractive substrate material for use in chemically aggressive environments.

However, achieving a desired set of attributes in a glass article, such as a desired index of refraction or the like, may require modifications to the glass composition which can be both expensive and time consuming to implement in a commercial of consumer application. Moreover, some applications may require a material having a high toughness which is generally lacking in glass.

Accordingly, a need exists for alternative glass articles having properties which can be readily modified to achieve specified functional characteristics in the glass article.

SUMMARY

According to one embodiment, a laminated glass article may include a glass core layer and at least one glass cladding layer fused to the glass core layer. The at least one glass cladding layer may be phase separated into a first phase and at least one second phase having different compositions. The first phase of the at least one glass cladding layer may have an interconnected matrix. The at least one second phase of the at least one glass cladding layer may be dispersed throughout the interconnected matrix of the first phase of the at least one glass cladding layer.

In another embodiment, a laminated glass article may include a glass core layer and at least one glass cladding layer fused to the glass core layer. The at least one glass cladding layer may include a phase separated glass composition. The at least one glass cladding layer may have a porous, interconnected matrix formed from a first phase of the phase separated glass composition.

In yet another embodiment, a method for forming a laminated glass article may include fusing at least one glass cladding layer to at least a portion of a glass core layer. The at least one glass cladding layer may be formed from a phase-separable glass composition. The at least one glass cladding layer fused to the surface of the glass core layer may be heated to a temperature sufficient to effect a phase separation in the at least one glass cladding layer such that, after the heating, the at least one glass cladding layer comprises a first phase and at least one second phase. Each of the first phase and at least one second phase may have different compositions. In some embodiments, the method may further comprise selectively removing the at least one second phase from the interconnected matrix of the first phase, thereby leaving a porous, interconnected matrix of the first phase in the at least one glass cladding layer.

Additional features and advantages of the glass compositions and glass articles formed from the glass composition will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
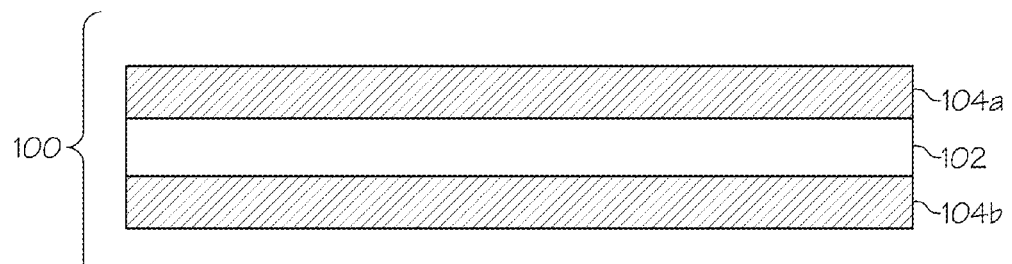
FIG. 1 schematically depicts a cross section of a laminated glass article according to one or more embodiments shown and described herein.

Reference will now be made in detail to embodiments of laminated glass articles having phase-separated glass cladding layers and methods for making the same. FIG. 1 schematically depicts a cross section of one embodiment of a laminated glass article. The laminated glass article generally comprises a glass core layer and at least one glass cladding layer fused to the glass core layer. The at least one glass cladding layer is phase separated into a first phase and at least one second phase. Each of the phases have different compositions. The first phase forms an interconnected matrix in the glass cladding layer. The second phase is dispersed throughout the interconnected matrix of the first phase. In some embodiments, the second phase is itself interconnected within the interconnected matrix of the first phase. In some of these embodiments, the second phase may be removed from the at least one glass cladding layer such that the at least one glass cladding layer comprises a porous, interconnected matrix formed from the first phase. Various embodiments of laminated glass articles and methods for making laminated glass articles will be described in more detail herein with specific reference to the appended drawings.

The term "liquidus viscosity," as used herein, refers to the shear viscosity of the glass composition at its liquidus temperature.

The term "liquidus temperature," as used herein, refers to the highest temperature at which devitrification occurs in the glass composition.

The term "CTE," as used herein, refers to the coefficient of thermal expansion of the glass composition averaged over a temperature range from about 20° C. to about 300° C.

The term "substantially free," when used to described the absence of a particular oxide component in a glass composition, means that the component is present in the glass composition as a contaminant in a trace amount of less than 1 mol. %.

In the embodiments of the glass compositions described herein, the concentration of constituent components (e.g., $SiO_2$, $Al_2O_3$, and the like) are given in mole percent (mol. %) on an oxide basis, unless otherwise specified.

Referring now to FIG. 1, a cross section of a laminated glass article is schematically depicted. The laminated glass article 100 generally comprises a glass core layer 102 and at least one glass cladding layer. In the embodiment depicted in FIG. 1, the laminated glass article includes a pair of glass cladding layers 104a, 104b. The glass core layer 102 generally comprises a first surface 103a and a second surface 103b which is opposed to the first surface 103a. In the embodiment depicted in FIG. 1, a first glass cladding layer 104a is fused to the first surface 103a of the glass core layer 102 and a second glass cladding layer 104b is fused to the second surface 103b of the glass core layer 102. The glass cladding layers 104a, 104b are fused to the glass core layer 102 without any additional materials, such as adhesives, coating layers or the like, disposed between the glass core layer 102 and the glass cladding layers 104a, 104b.

In the embodiments of the laminated glass articles described herein, the glass cladding layers 104a, 104b are phase separated into a first glass phase and at least one second glass phase with each of the glass phases having different compositions. Accordingly, it should be understood that the glass cladding layers 104a, 104b are formed from a glass composition which is susceptible to phase separation upon exposure to a phase separation treatment (i.e., the glass composition is a "phase-separable" glass composition). The phrase "phase-separable" glass composition, as used herein, refers to a glass composition which undergoes phase separation into two or more distinct phases upon exposure to a phase separation treatment, such as a heat treatment or the like. In some embodiments, the phase separated glass cladding layers 104a, 104b include an interconnected matrix of glass formed from the first phase and the second phase is dispersed throughout the interconnected matrix as discrete, unconnected regions of glass having the composition of the second phase. The size and dispersion of the regions of the second phase may be controlled to obtain a desired index of refraction in the glass cladding layers as the second phase may induce a certain amount of light scattering. Additionally or alternatively, the second phase may have a different modulus of elasticity and loss tangent than the first phase. The difference in these properties may be utilized to control the acoustic properties of the laminated glass article. Specifically, the amount, dispersion, and size of regions of the second phase may be controlled to obtain a laminated glass article with the desired acoustical properties.

In some other embodiments, the phase separated glass of the glass cladding layers 104a, 104b may be a spinodal phase separated glass (i.e., the glass cladding layers are formed from a glass composition which is susceptible to spinodal decomposition). In these embodiments the glass cladding layers 104a, 104b include an interconnected matrix of glass formed from the first phase with the second phase dispersed throughout the interconnected matrix of the first phase. However, in these embodiments, the second phase is itself interconnected within the interconnected matrix of the first phase. In these embodiments, the first phase and the at least one second phase may have different dissolution rates in water, alkaline solutions, and/or acidic solutions. For example, the at least one second phase present in the phase separated glass cladding layers 104a, 104b may more readily dissolve in water and/or acidic solutions than the first phase. Alternatively, the first phase present in the phase separated glass cladding layers 104a, 104b may more readily dissolve in water and/or acidic solutions than the at least one second phase. This characteristic enables either first phase or the second phase to be selectively removed from the glass cladding layers 104a, 104b such that the glass cladding layers 104a, 104b are a porous, interconnected matrix formed from the remaining phase of the phase separated glass composition.

In some embodiments, the phase separated glass of the glass cladding layers may have an opalescence or opal-type appearance due to the phase separation. The opalescence may give the glass a white opal or blue translucent opal appearance, other it should be understood that other colors are contemplated with the addition of colorants. The opalescence may be desired for applications in which the laminated glass article is used to enhance the aesthetics of an object.

The glass cladding layers 104a, 104b may be formed from various glass compositions so long as the glass compositions are amenable to phase separation into a first phase and at least one second phase having different compositions. In one embodiment, the glass cladding layers are formed from the glass composition disclosed in U.S. Provisional Patent Application No. 61/604,839 filed Feb. 29, 2012 and entitled "Low CTE Alkali-Free Boroaluminosilcate Glass Compositions and Glass Articles Comprising the Same", the entirety of which is incorporated by reference herein. In this embodiment, the glass composition comprises a combination of $SiO_2$, $Al_2O_3$, $B_2O_3$, and alkaline earth oxides. It has now been found that this glass readily undergoes phase separation upon heat treatment below the spinodal temperature. This result is unexpected due to the absence of alkali constituents in the glass composition which are generally present in glass compositions which readily undergo phase separation.

In the aforementioned exemplary glass composition $SiO_2$ is the largest constituent and, as such, $SiO_2$ is the primary constituent of the glass network formed from the glass composition. Pure $SiO_2$ has a relatively low CTE and is alkali free. However, pure $SiO_2$ has an extremely high melting point. Accordingly, if the concentration of $SiO_2$ in the glass composition is too high, the formability of the glass composition may be diminished as higher concentrations of $SiO_2$ increase the difficulty of melting the glass which, in turn, adversely impacts the formability of the glass. In this embodiment, the glass composition generally comprises $SiO_2$ in a concentration less than or equal to about 66 mol. % in order to facilitate fusion forming the glass composition. For example, in some embodiments, the concentration of $SiO_2$ in the glass composition is greater than or equal to about 60 mol. % and less than or equal to about 66 mol. %. In some other embodiments, $SiO_2$ is present in the glass composition in a concentration greater than or equal to about 63 mol. % and less than or equal to about 65 mol. %.

The glass composition of this embodiment further comprises $Al_2O_3$. $Al_2O_3$ serves as a glass network former, similar to $SiO_2$. Like $SiO_2$, $Al_2O_3$ increases the viscosity of the glass composition due to its tetrahedral coordination in a glass melt formed from the glass composition. However, when the concentration of $Al_2O_3$ is balanced against the concentration of $SiO_2$ and the concentration of alkaline earth oxides in the glass composition, $Al_2O_3$ can reduce the liquidus temperature of the glass melt, thereby enhancing the liquidus viscosity and improving the compatibility of the glass composition with certain forming processes such as the fusion forming process.

The concentration of $Al_2O_3$ in the glass composition is generally less than or equal to about 10 mol. % in order to achieve the desired liquidus temperature to facilitate formation of the laminated glass article using fusion forming techniques. For example, in some embodiments, the concentration of $Al_2O_3$ in the glass composition is greater than or equal to about 7 mol. % and less than or equal to about 10 mol. %. In some of these embodiments, the concentration of $Al_2O_3$ in the glass composition may be less than or equal to about 9 mol. % or even less than or equal to about 8 mol. %. For example, in some embodiments, the concentration of $Al_2O_3$ in the glass composition is greater than or equal to about 7 mol. % and less than or equal to about 9 mol. % or even greater than or equal to about 7 mol. % and less than or equal to about 8 mol. %.

The glass composition of this embodiment may further comprise $B_2O_3$. Like $SiO_2$ and $Al_2O_3$, $B_2O_3$ contributes to the formation of the glass network. $B_2O_3$ is added to the glass composition to decrease the viscosity and liquidus temperature of the glass. Specifically, an increase in the concentration of $B_2O_3$ by 1 mol. % may decrease the temperature required to obtain an equivalent viscosity by 10° C. to 14° C., depending on the specific composition of the glass. However, $B_2O_3$ can lower the liquidus temperature of a glass composition by 18° C. to 22° C. per mol. % of $B_2O_3$. As such, $B_2O_3$ decreases the liquidus temperature of the glass composition more rapidly than it decreases the liquidus viscosity of the glass composition. $B_2O_3$ is also added to the glass composition to soften the glass network. Moreover, when the glass composition is used for glass cladding layers in a fusion formed laminated glass article, the $B_2O_3$ in the glass cladding layers is utilized to match the viscosity of the glass cladding layers to that of the glass core layer, particularly when the glass core layer is an alkali-containing glass core layer. Further, additions of $B_2O_3$ to the glass composition also reduce the Young's modulus of the glass composition and improve the intrinsic damage resistance of the glass. In addition, the incorporation of $B_2O_3$ in the glass composition also facilitates phase separating the glass composition into a silica-rich phase and a boron-rich phase. In these embodiments, the silica-rich phase may be less susceptible to dissolution in water and/or an acidic solution than the boron-rich phase which, in turn, facilitates the selective removal of the boron-rich phase and the formation of a porous microstructure in the glass cladding layers.

In this embodiment, $B_2O_3$ is generally present in the glass composition in a concentration greater than or equal to about 14 mol. %. For example, in some embodiments, $B_2O_3$ is present in the glass composition in a concentration greater than or equal to about 14 mol. % and less than or equal to about 18 mol. %. In some of these embodiments, the concentration of $B_2O_3$ in the glass composition may be less than or equal to about 17 mol. % or even less than or equal to about 16 mol. %. In other embodiments described herein, $B_2O_3$ is present in the glass composition in a concentration greater than or equal to about 16 mol. % and less than or equal to about 17 mol. %.

This embodiment of the glass composition used for the glass cladding layers may also include at least one alkaline earth oxide. The alkaline earth oxide generally improves the melting behavior of the glass composition by lowering the temperature required for melting. Moreover, a combination of several different alkaline earth oxides assists in lowering the liquidus temperature of the glass composition and increasing the liquidus viscosity of the glass composition. The alkaline earth oxides included in the glass composition are CaO, MgO, SrO and/or combinations thereof.

The alkaline earth oxide is present in the glass composition in a concentration greater than or equal to about 9 mol. % and less than or equal to about 16 mol. %. In some embodiments, the glass composition may comprise from about 11 mol. % to about 12 mol. % alkaline earth oxide. The glass composition includes at least CaO as an alkaline earth oxide in a concentration greater than or equal to about 3 mol. % and less than or equal to about 12 mol. %. In some embodiments, the concentration of CaO may be greater than or equal to about 7 mol. % and less than or equal to about 12 mol. %. The alkaline earth oxide may further include MgO in a concentration greater than or equal to about 0 mol. % and less than or equal to about 6 mol. %. In some embodiments the concentration of MgO in the glass composition may be greater than or equal to about 2 mol. % and less than or equal to about 4 mol. %. The alkaline earth oxide in the glass composition may also include SrO in a concentration greater than or equal to about 0 mol. % and less than or equal 6 mol. %. In some embodiments, the SrO may be present in the glass composition in a concentration from about 1 mol. % to about 4 mol. %.

This particular glass composition used for forming the glass cladding layers of the laminate glass article may be substantially free from alkali metals and compounds containing alkali metals. Accordingly, it should be understood that the glass composition is substantially free from alkali oxides such as $K_2O$, $Na_2O$ and $Li_2O$.

This exemplary glass composition may optionally include one or more fining agents. The fining agents may include, for example, $SnO_2$, $As_2O_3$, $Sb_2O_3$ and combinations thereof. The fining agents may be present in the glass composition in an amount greater than or equal to about 0 mol. % and less than or equal to about 0.5 mol. %. In exemplary embodiments, the fining agent is $SnO_2$. In these embodiments, $SnO_2$ may be present in the glass composition in a concentration which is greater than about 0 mol. % and less than or equal to about 0.2 mol. % or even less than or equal to about 0.15 mol. %.

Accordingly, in at least one embodiment, the glass cladding layers 104a, 104b may be formed from a glass composition which includes from about 60 mol. % to about 66 mol. % $SiO_2$; from about 7 mol. % to about 10 mol. % $Al_2O_3$; and from about 14 mol. % to about 18 mol. % $B_2O_3$ as glass network formers. The glass composition from which the glass cladding layers are formed may further include from about 9 mol. % to about 16 mol. % alkaline earth oxide. The alkaline earth oxide includes at least CaO. The CaO may be present in the glass composition in a concentration from about 3 mol. % to about 12 mol. %. The glass composition may be substantially free from alkali metals and compounds containing alkali metals.

While reference has been made herein to a specific phase-separable glass composition used for forming the glass cladding layers 104a, 104b, it should be understood that other glass compositions may be used to form the glass cladding layers 104a, 104b of the laminated glass article 100 so long as the glass compositions are phase-separable.

In some embodiments, the glass composition from which the glass cladding layers 104a, 104b are formed may optionally include a colorant. The colorant is added to the glass composition to impart color to the glass cladding layers. Suitable colorants include, without limitation, $Fe_2O_3$, $Cr_2O_3$, $Co_3O_4$, CuO, Au, Ag, NiO, $MnO_2$, and $V_2O_5$, each of which may impart a unique color to the glass cladding layers. In some embodiments, combinations of two or more colorants may be used to achieve a desired color.

In some embodiments described herein, the glass compositions used for forming the glass cladding layers 104a, 104b have a liquidus viscosity which renders them suitable for use in a fusion draw process and, in particular, for use as a glass cladding composition in a fusion lamination process. For example, in some embodiments, the liquidus viscosity is greater than or equal to about 50 kPoise. In some other embodiments, the liquidus viscosity may be greater than or equal to 100 kPoise or even greater than or equal to 250 kPoise.

The laminated glass articles 100 described herein may have improved strength as a result of being laminated. For example, in some embodiments, the glass cladding layers 104a, 104b are formed from a glass composition which has a lower average coefficient of thermal expansion (CTE) than the glass core layer 102. For example, when glass cladding layers formed from a glass composition having a relatively low average CTE are paired with a glass core layer formed from a glass composition having a higher average CTE during a lamination process, the difference in the CTEs of the glass core layer and the glass cladding layers results in the formation of a compressive stress in the glass cladding layers upon cooling. In some embodiments described herein, the glass cladding layers are formed from glass compositions which have average CTEs less than or equal to about $40 \times 10^{-7}/°$ C. averaged over a range from 20° C. to 300° C. In some embodiments, the average CTE of the glass compositions may be less than or equal to about $37 \times 10^{-7}/°$ C. averaged over a range from 20° C. to 300° C. In yet other embodiments, the average CTE of the glass compositions may be less than or equal to about $35 \times 10^{-7}/°$ C. averaged over a range from 20° C. to 300° C.

As noted hereinabove, in some embodiments, the glass cladding layers 104a, 104b are formed from glass compositions which are substantially free from alkali metals and compounds containing alkali metals including, without limitation, alkali oxides. Forming the glass cladding layers 104a, 104b from glass compositions which are free from alkali oxides, such as $K_2O$, $Na_2O$, and $Li_2O$ may assist in lowering the CTE of the glass cladding layers which can influence the magnitude of the compressive stress achieved in the glass cladding layers following lamination. In addition, certain applications, such as electronic substrates and the like, may require that the surface of the laminated glass article is free from alkali ions in order to prevent the migration of highly mobile alkali ions from the glass to electronic devices deposited on the glass which can degrade the performance of the electronic devices by so-called "alkali poisoning."

However, in some other embodiments, the glass cladding layers 104a, 104b may be formed from glass compositions which contain alkali ions. In these embodiments, the presence of the alkali ions may facilitate chemically strengthening the glass by ion exchange, thereby improving the strength of the laminated glass article.

Figure 3:
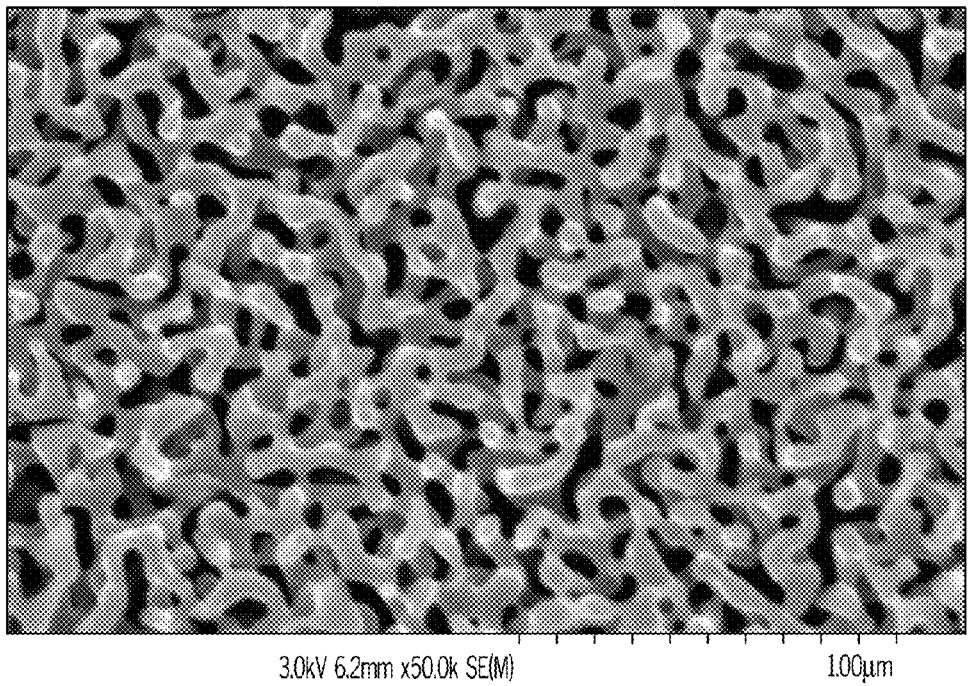
FIG. 3 is an SEM micrograph depicting the microstructure of a glass cladding layer of a laminated glass article after removal of at least one second phase, according to one or more embodiments shown and described herein.

Referring now to FIG. 3, forming the glass cladding layers 104a, 104b from a glass composition which is phase-separable may facilitate the subsequent formation of a microstructure in the glass cladding layers by removing at least one of the phases from the glass. For example, in some embodiments, the glass cladding layers may be formed from a glass composition which phase separates by spinodal decomposition. In these embodiments, the glass cladding layers comprise an interconnected matrix formed from a first phase with at least one second phase dispersed within the first phase. In these embodiments, the at least one second phase is itself interconnected within the interconnected matrix formed by the first phase. One of the phases may be less susceptible to dissolution in water, alkaline solutions, and/or acidic solutions than the other phase. For example, in some embodiments, the second phase may be more susceptible to dissolution than the first phase. Accordingly, the at least one second phase may be selectively removed from the interconnected matrix formed by the first phase by dissolution in water and/or an acidic solution. After the at least one second phase is removed from the glass, the glass cladding layers have a porous, interconnected matrix formed by the first phase, as is depicted in FIG. 3. The lighter regions in FIG. 3 shown the interconnected matrix formed by the first phase while the darker regions are the porosity of the interconnected matrix which corresponds to the space previously occupied by the at least one second phase.

In embodiments where the glass cladding layers 104a, 104b have a porous, interconnected matrix formed by the first phase of the phase separated glass, the porous, interconnected matrix may be coated with a secondary material which imparts a desired functionality to the laminated glass article. Suitable materials include, without limitation, inorganic materials such as metals, alloys, and/or ceramics, or organic materials such as polymers and biologically active materials. For example, in some embodiments, the porous, interconnected matrix may be coated or at least partially filled with a catalytically active material. Such materials may include, without limitation, catalytically active precious metals and alloys such as platinum, palladium, and rhodium, zeolites, metal oxides and the like. In some other embodiments, the porous, interconnected matrix may be coated or at least partially filled with a biologically active material. Such materials may include, without limitation biologically active glass materials, such as borate and phosphate glasses. Other suitable biologically active glass include, without limitation, the glass materials listed in *Bio-Glasses: An Introduction*, Jones and Clare, eds. (John Wiley and Sons, 2012).

Alternatively, the porous, interconnected matrix may be partially or completely filled with a secondary material to enhance one or more physical properties of the laminated glass article. In some embodiments, the secondary material may be a polymer material which is used to alter the index of refraction of the glass cladding layers, alter the acoustic properties of the glass cladding layers, improve the strength of the glass cladding layers, create a particular optical or electronic property in the glass cladding layers, or provide a surface modification to the glass cladding layers. For example, in some embodiments, the porous, interconnected matrix may be partially or completely filled with a polymer material to enhance the toughness of the laminated glass article. Glass generally has a high strength but a low toughness while polymers generally have a low strength with a high toughness. Accordingly, by partially or completely filling the porous, interconnected porosity of the glass cladding layer with a polymer material, the toughness of the laminated glass article may be improved. The polymer materials used to partially or completely fill the porous, interconnected matrix may be reactive or non-reactive materials. Reactive polymer materials have functional groups which react with the glass surface to form a chemically bonded network. These reactions may be initiated in a variety of different ways including, without limitation, by heat, UV radiation, e-beam, or the like. Non-reactive polymer materials passively fill the porous surface of the glass without any chemical reactions occurring between the glass and the polymer. Suitable polymer materials include, without limitation, poly epoxies, polyamides, polyimides, polyesters, polyurethanes, polyethers, polysiloxanes, polyvinyls, polyanhydrides, polyureas, polycarbonate, polysulfides, and polysulfones.

In other embodiments, the porous, interconnected matrix may be filled with a secondary material which alters the coefficient of thermal expansion of the material. For example, the porous, interconnected matrix of the glass cladding layers may be filled with a secondary material which has a lower coefficient of expansion than the first glass phase thereby reducing the overall coefficient of thermal expansion of the glass cladding layers. In one embodiment, this may be accomplished by filling the porous, interconnected matrix with a sol of silica which, after drying and/or firing, fills the interconnected matrix with silica adhered to the first phase of the glass cladding layers, thereby reducing the coefficient of thermal expansion of the glass cladding layers.

In still other embodiments, the porous, interconnected matrix may be partially or completely filled with a secondary material which modifies the index of refraction of the laminated glass article. Suitable materials for modifying the index of refraction of the laminated glass article include, without limitation, polymer materials such as poly epoxies, polyamides, polyimides, polyesters, polyurethanes, polyethers, polysiloxanes, polyvinyls, polyanhydrides, polyurias, polycarbonate, polysulfides, and polysulfones. However, it should be understood that other types of materials may also be used including, without limitation, combinations of polymer materials and ceramic materials and/or metallic materials.

Similarly, polymer material partially or completely filling the porous, interconnected matrix of the glass cladding layers may alter the acoustic properties of the laminated glass article, providing an acoustically insulating laminated glass article. For example, the acoustic properties of the laminated glass article generally depend on the rigidity (modulus) and damping (the loss tangent) of the article. By filling (or partially filling) the porous, interconnected matrix of the glass cladding layers with a polymer material, the acoustic properties of the laminated glass article are modified while the core layer gives the laminated glass article a desired overall rigidity.

In some embodiments described herein, the glass composition from which the glass cladding layers 104a, 104b are formed may contain one or metallic constituents such as gold, silver, copper, platinum or the like. In these embodiments, the laminated glass article may be heat treated to cause the precipitation of the metallic constituents in the first phase of the glass composition. In embodiments where the glass cladding layers 104a, 104b have a porous, interconnected matrix formed by a first phase of a phase separated class composition, the precipitation of the metallic constituents may deposit the metallic constituents at or near the surface of the porous, interconnected matrix.

Referring again to FIG. 1, the glass core layer 102 may be formed from a variety of different glass compositions so long as the composition of the glass core layer 102 is capable of being fused to the glass cladding layers 104a, 104b. In some embodiments, the glass core layer may include alkali metals and/or compounds containing alkali metals while, in other embodiments, the glass core layer may be substantially free from alkali metals and/or compounds containing alkali metals.

In embodiments in which the glass cladding layers 104a, 104b of the laminated glass article 100 are compressively stressed as a result of the lamination process, the glass core layer 102 is formed from a glass composition which has a high average coefficient of thermal expansion relative to the glass cladding layers 104a, 104b. As described herein, when glass cladding layers formed from glass compositions with low average CTEs are paired with a glass core layer formed from a glass composition which has a relatively higher average CTE during a fusion lamination process, the difference in the average CTEs of the glass core layer and the glass cladding layers results in the formation of a compressive stress in the glass cladding layers as the laminated structure cools without the structure being ion exchanged or thermally tempered. In some embodiments, the glass core layer may be formed from glass compositions which have an average coefficient of thermal expansion (CTE) which is greater than or equal to about $40 \times 10^{-7}/°$ C. in a range from 20° C. to 300° C. In some of these embodiments, the average CTE of the glass composition of the glass core layer may be greater than or equal to about $60 \times 10^{-7}/°$ C. in a range from 20° C. to 300° C. In yet other embodiments, the average CTE of the glass composition of the glass core layer may be greater than or equal to about $80 \times 10^{-7}/°$ C. averaged over a range from 20° C. to 300° C.

In some embodiments of the laminated glass article 100 described herein, the glass composition from which the glass core layer 102 is formed has a liquidus viscosity and a liquidus temperature suitable for fusion formation. For example, the glass composition from which the glass core layer 102 is formed may have a liquidus viscosity that is greater than or equal to about 35 kPoise. In some embodiments, the liquidus viscosity of the glass composition from which the glass core layer 102 is formed is greater than or equal to 100 kPoise or even greater than or equal to 200 kPoise. The liquidus temperature of the glass composition from which the glass core layer is formed may be less than or equal to about 1400° C. In some embodiments, the liquidus temperature is less than or equal to 1350° C. or even less than or equal to 1300° C.

In the embodiments described herein, the glass core layer 102 is formed from a glass composition which not phase-separable. This improves the mechanical integrity of the laminated glass article 100, particularly when the glass cladding layers 104a, 104b are formed such that the glass cladding layers have a porous, interconnected matrix.

In one particular embodiment, the glass core layer 102 of the laminated glass article is formed from a glass composition which comprises from about 60 to about 73 mol. % $SiO_2$; from about 5 to about 16 mol. % $Al_2O_3$; from about 0 to 16 mol. % $B_2O_3$; from about 0 to 16 mol. % $Na_2O$; from about 0 to about 16 mol. % $K_2O$, wherein a total of $Na_2O$ and $K_2O$ is less than or equal to 16 mol. %; from about 0 to about 8 mol. % MgO; from about 0 to about 16 mol. % CaO; from about 0 to about 16 mol. % SrO; from about 0 to about 16 mol. % BaO; from about 0 to about 8 mol. % ZnO, wherein the sum of MgO+CaO+SrO+BaO+ZnO is from about 0 to about 20 mol. %. The glass composition may also comprise a fining agent such as $SnO_2$. In one particular embodiment, the glass composition is formed from 61.97 mol. % $SiO_2$; 10.89 mol. % $Al_2O_3$; 10.09 mol. % $B_2O_3$; 6.16 mol. % MgO; 5.45 mol. % CaO; 3.09 mol. % SrO; 2.17 mol. % $K_2O$; and 0.04 mol. % $SnO_2$. However, it should be understood that other glass compositions may be used to form the glass core layer 102 of the laminated glass article 100, so long as the glass composition of the glass core layer 102 is capable of being fused to the glass composition of the glass cladding layers 104a, 104b.

A variety of processes may be used to form the laminated glass articles described herein including, without limitation, the fusion lamination process, slot-draw lamination processes, and float glass processes.

Figure 4:
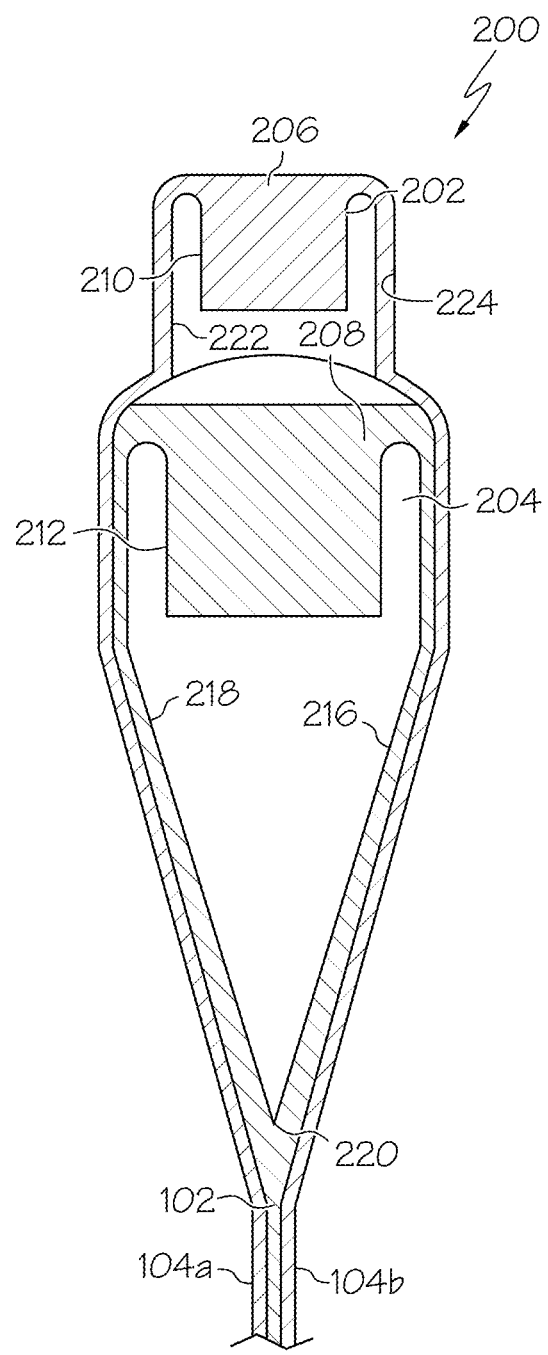
FIG. 4 schematically depicts a fusion draw process for making the glass article of FIG. 1.

In one particular embodiment, the laminated glass articles 100 may be formed by the fusion lamination process as described in U.S. Pat. No. 4,214,886, which is incorporated herein by reference. Referring to FIG. 4 by way of example, a laminate fusion draw apparatus 200 for forming a laminated glass article includes an upper isopipe 202 which is positioned over a lower isopipe 204. The upper isopipe 202 includes a trough 210 into which a phase-separable molten glass cladding composition 206 is fed from a melter (not shown). Similarly, the lower isopipe 204 includes a trough 212 into which a molten glass core composition 208 is fed from a melter (not shown).

As the molten glass core composition 208 fills the trough 212, it overflows the trough 212 and flows over the outer forming surfaces 216, 218 of the lower isopipe 204. The outer forming surfaces 216, 218 of the lower isopipe 204 converge at a root 220. Accordingly, the molten glass core composition 208 flowing over the outer forming surfaces 216, 218 rejoins at the root 220 of the lower isopipe 204 thereby forming a glass core layer 102 of a laminated glass article.

Simultaneously, the phase-separable molten glass cladding composition 206 overflows the trough 210 formed in the upper isopipe 202 and flows over outer forming surfaces 222, 224 of the upper isopipe 202. The phase-separable molten glass cladding composition 206 is outwardly deflected by the upper isopipe 202 such that the phase-separable molten glass cladding composition 206 flows around the lower isopipe 204 and contacts the molten glass core composition 208 flowing over the outer forming surfaces 216, 218 of the lower isopipe, fusing to the molten glass core composition and forming glass cladding layers 104a, 104b around the glass core layer 102.

As noted hereinabove, in some embodiments, the molten glass core composition 208 has an average coefficient of thermal expansion $CTE_{core}$ which is greater than the average coefficient of thermal expansion $CTE_{clad}$ of the phase-separable molten glass cladding composition 206. Accordingly, as the glass core layer 102 and the glass cladding layers 104a, 104b cool, the difference in the average coefficients of thermal expansion of the glass core layer 102 and the glass cladding layers 104a, 104b cause a compressive stresses to develop in the glass cladding layers 104a, 104b. The compressive stress increases the strength of the resulting laminated glass article without an ion-exchange treatment or thermal tempering treatment.

Once the glass cladding layers 104a, 104b have been fused to the glass core layer 102 thereby forming a laminated glass article 100, the laminated glass article may be optionally shaped into a desired three-dimensional form, such as by vacuum molding or any other conventional glass shaping process.

Once the laminated glass article 100 is formed by fusing the glass cladding layers 104a, 104b to the glass core layer 102 and optionally shaped, the laminated glass article 100 is heat treated to induce phase separation in the glass cladding layers 104a, 104b, thereby producing an interconnected matrix of a first phase in which at least one second phase is dispersed in the glass cladding layers 104a, 104b. The heat treatment process generally includes heating the glass to a temperature the upper consulate temperature or spinodal temperature of the phase-separable glass composition from which the glass cladding layers 104a, 104b are formed and holding the laminated glass article 100 at this temperature for a time period sufficient to induce the desired amount of phase separation in the glass cladding layers 104a, 104b. In some embodiments described herein, the laminated glass article 100 is heated to a temperature in a range from less than or equal to about 600° C. below the spinodal temperature of the phase separable glass composition up to the spinodal temperature in order to induce phase separation in the glass cladding layers 104a, 104b. In some other embodiments, the laminated glass article 100 is heated to a temperature in a range from less than or equal to about 300° C. below the spinodal temperature of the phase-separable glass composition up to the spinodal temperature in order to induce phase separation in the glass cladding layers 104a, 104b. In still other embodiments, the laminated glass article 100 is heated to a temperature in a range from less than or equal to about 200° C. below the spinodal temperature of the phase-separable glass composition up to the spinodal temperature in order to induce phase separation in the glass cladding layers 104a, 104b. In further embodiments, the laminated glass article 100 is heated to a temperature in a range from less than or equal to about 100° C. below the spinodal temperature of the phase-separable glass composition up to the spinodal temperature in order to induce phase separation in the glass cladding layers 104a, 104b.

The laminated glass article 100 may be held at the heat treatment temperature for a time period sufficient to impart the desired amount of phase separation to the glass cladding layers 104a, 104b of the laminated glass article 100. In general, the longer the laminated glass article 100 is held at the heat treatment temperature, the greater the amount of phase separation that occurs in the glass cladding layers 104a, 104b of the laminated glass article.

In some embodiments, the laminated glass article 100 may be held at the heat treatment temperature for a time period greater than or equal to about 1 minute and less than or equal to about 10 hours. In some other embodiments, the laminated glass article 100 may be held at the heat treatment temperature for a time period greater than or equal to about 30 minutes and less than or equal to about 5 hours, or even less than or equal to about 2.5 hours. However, it should be understood that longer or shorter time periods may be used depending on the desired amount of phase separation in the glass cladding layers.

In some embodiments, heat treatment of the laminated glass article 100 is utilized to disperse discrete regions of at least one second phase within an interconnected matrix formed from a first phase of the glass composition from which the glass cladding layers 104a, 104b are formed. In this embodiment, the size and amount of the dispersed discrete regions of the at least one secondary phase may be controlled by controlling the time and/or temperature of the heat treatment which, in turn, changes the optical properties of the resultant laminated glass article. For example, by controlling the size and amount of the dispersed discrete regions of the at least one second phase, the amount of light scattering which occurs within the laminated glass article 100 and/or the acoustic properties of the laminated glass article 100 may be controlled. Laminated glass articles 100 formed in this manner may be utilized in lighting applications, light filtration applications, and similar applications. Alternatively, laminated glass articles 100 formed in this manner may be utilized for building and automotive glazing.

In some embodiments, the heat treatment time and temperature are selected such that, if the at least one second phase is subsequently removed from the first phase, the glass cladding layers 104a, 104b have a desired index of refraction due to the resulting porosity of the glass cladding layers. More specifically, the time and temperature of the heat treatment may be selected such that a desired amount and distribution of the at least one second phase is present in the interconnected matrix of the first phase which, when removed from the interconnected matrix of the first phase, produces a desired index of refraction in the glass cladding layers 104a, 104b.

In some other embodiments, following the heat treatment to induce phase separation in the glass cladding layers 104a, 104b, the laminated glass article 100 is further processed to remove the at least one second phase from the interconnected matrix of the first phase of the glass cladding layers 104a, 104b, such as when a porous, interconnected matrix of the first phase is desired in the glass cladding layers 104a, 104b. In these embodiments, the at least one second phase may be removed from the interconnected matrix of the first phase by etching the laminated glass article. As noted hereinabove, in some embodiments, the at least one second phase has a greater dissolution rate in water, alkaline solutions, and/or acidic solutions than the first phase of the phase separated glass composition of the glass cladding layers 104a, 104b making the at least one second phase more susceptible to dissolution than the first phase. A variety of etchants or combinations of etchants may be used including, without limitation, hydrofluoric acid, hydrochloric acid, nitric acid, sulfuric acid, or combinations thereof. The laminated glass article 100 is contacted with the etchant for a period of time sufficient to completely remove the at least one second phase from the interconnected matrix of the first phase in the glass cladding layers 104a, 104b, thereby leaving a porous, interconnected matrix of the first phase.

In some embodiments, the porous, interconnected matrix of the first phase may be coated or filled with a secondary material, as described herein. A variety of techniques may be used to fill or coat the porous, interconnected matrix with the secondary material including, without limitation, dip coating, flow coating, vacuum coating, or the like.

EXAMPLES

Embodiments of the laminated glass articles described herein will be further clarified by the following examples.

A laminated glass article was formed using the laminate fusion process described hereinabove. The glass cladding layers were formed from a glass composition comprising 64.62 mol. % $SiO_2$; 7.38 mol. % $Al_2O_3$; 16.46 mol. % $B_2O_3$; 2.21 mol. % MgO; 8.14 mol. % CaO; 1.12 mol. % SrO; and 0.06 mol. % $SnO_2$. The glass core layer was formed from a glass composition comprising 61.97 mol. % $SiO_2$; 10.89 mol. % $Al_2O_3$; 10.09 mol. % $B_2O_3$; 6.16 mol. % MgO; 5.45 mol. % CaO; 3.09 mol. % SrO; 2.17 mol. % $K_2O$; and 0.04 mol. % $SnO_2$.

Figure 2:
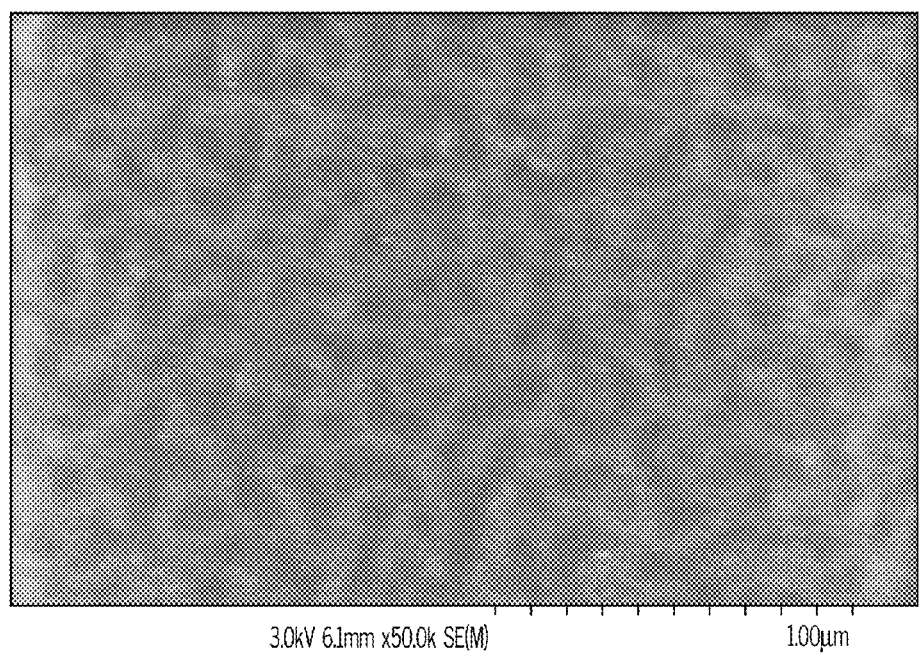
FIG. 2 is an SEM micrograph depicting the microstructure of a glass cladding layer of a laminated glass article after phase separation, according to one or more embodiments shown and described herein.

The laminated glass article was heat treated at a temperature of 950° C. for 2 hours. This caused the glass of the glass cladding layers to spinodally decompose into an interconnected matrix of a first phase and a second phase which was dispersed and interconnected within the interconnected matrix of the first phase. FIG. 2 is an SEM micrograph showing the glass of the glass cladding layers after heat treatment. The first phase generally consisted of a silica-rich phase while the second phase generally consisted of a boron-rich phase.

The laminated glass article was then acid etched in a 1% solution of hydrofluoric acid for 1 minute to selectively remove the second phase from the first phase. FIG. 3 is an SEM micrograph showing the glass of the glass cladding layers following removal of the second phase from the interconnected matrix of the first phase leaving a porous, interconnected matrix of the first phase.

It should now be understood that the glass articles described herein may be formed with glass cladding layers which are phase separated. In some embodiments, the degree of phase separation may be controlled to impart a desired optical property, such as a desired index of refraction or the like, to the laminated glass article. Alternatively, the glass cladding layers may be phase separated to facilitate removing a second phase from an interconnected matrix of the first phase, thereby creating a porous interconnected matrix formed from the first phase. The porosity of the porous interconnected matrix may be specifically tailored to achieve a desired optical property, such as a desired index of refraction. In some embodiments, the porous, interconnected matrix may be coated or at least partially filled with a secondary material to improve the physical properties of the laminated glass article and/or impart a specific functionality to the laminated glass article including, without limitation, catalytic activity or biological activity. In embodiments where the glass cladding layers comprise a porous, interconnected matrix, the solid glass core layer provides additional mechanical strength to the laminated glass article.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A laminated glass article comprising:
a glass core layer; and
at least one glass cladding layer fused to the glass core layer, wherein:
the at least one glass cladding layer is phase separated into a first phase and at least one second phase having different compositions;
the first phase comprises an interconnected matrix;
the at least one second phase is dispersed throughout the interconnected matrix; and
the at least one glass cladding layer is free from alkali ions.

2. The laminated glass article of claim 1, wherein the first phase and the at least one second phase have different dissolution rates in water, alkaline solutions, or acidic solutions.

3. The laminated glass article of claim 1, wherein the first phase and the at least one second phase have different moduli of elasticity and loss tangents.

4. The laminated glass article of claim 1, wherein the at least one second phase is interconnected within the interconnected matrix of the first phase.

5. The laminated glass article of claim 1, wherein the at least one glass cladding layer is formed from a glass composition susceptible to spinodal decomposition.

6. The laminated glass article of claim 1, wherein the at least one glass cladding layer is formed from a glass composition comprising:
from about 60 mol. % to about 66 mol. % $SiO_2$;
from about 7 mol. % to about 10 mol. % $Al_2O_3$;
from about 14 mol. % to about 18 mol. % $B_2O_3$;
from about 9 mol. % to about 16 mol. % alkaline earth oxide, wherein the alkaline earth oxide comprises at least CaO and the CaO is present in the glass composition in a concentration from about 3 mol. % to about 12 mol. %.

7. The laminated glass article of claim 1, wherein the glass core layer comprises a non-phase-separable glass composition.

8. The laminated glass article of claim 1, wherein the glass core layer comprises a liquidus viscosity of greater than or equal to about 35 kPoise.

9. The laminated glass article of claim 1, wherein the at least one glass cladding layer comprises a first glass cladding layer fused to a first surface of the glass core layer and a second glass cladding layer fused to a second surface of the glass core layer.

10. The laminated glass article of claim 9, wherein the first glass cladding layer and the second glass cladding layer are formed from a glass composition comprising a lower average coefficient of thermal expansion (CTE) than the glass core layer.

11. The laminated glass article of claim 1, wherein the at least one glass cladding layer is formed from a glass composition comprising an average CTE of less than or equal to about $40 \times 10^{-7}/°$ C. in a range from 20° C. to 300° C.

12. The laminated glass article of claim 1, wherein the glass core layer comprises an average CTE of greater than or equal to about $40 \times 10^{-7}/°$ C. in a range from 20° C. to 300° C.

13. The laminated glass article of claim 1, wherein the glass core layer comprises about 60 mol. % to about 73 mol. % $SiO_2$.

14. An electronic substrate comprising the laminated glass article of claim 1.

15. A laminated glass article comprising:
a glass core layer; and
at least one glass cladding layer fused to the glass core layer, wherein:
the at least one glass cladding layer is phase separated into a first phase and at least one second phase having different compositions;
the first phase comprises an interconnected matrix;
the at least one second phase is dispersed throughout the interconnected matrix, and
the at least one glass cladding layer is formed from a glass composition comprising an average CTE of less than or equal to about $40 \times 10^{-7}/°$ C. in a range from 20° C. to 300° C.

16. The laminated glass article of claim 15, wherein the glass composition of the at least one glass cladding layer is susceptible to spinodal decomposition.

17. The laminated glass article of claim 15, wherein the at least one glass cladding layer comprises a first glass cladding layer fused to a first surface of the glass core layer and a second glass cladding layer fused to a second surface of the glass core layer.

18. A laminated glass article comprising:
a glass core layer; and
at least one glass cladding layer fused to the glass core layer, wherein:
the at least one glass cladding layer is phase separated into a first phase and at least one second phase having different compositions;
the first phase comprises an interconnected matrix;
the at least one second phase is dispersed throughout the interconnected matrix, and
the at least one glass cladding layer is formed from a glass composition comprising:
from about 60 mol. % to about 66 mol. % $SiO_2$;
from about 7 mol. % to about 10 mol. % $Al_2O_3$;
from about 14 mol. % to about 18 mol. % $B_2O_3$;
from about 9 mol. % to about 16 mol. % alkaline earth oxide, wherein the alkaline earth oxide comprises at least CaO and the CaO is present in the glass composition in a concentration from about 3 mol. % to about 12 mol. %.

19. The laminated glass article of claim 18, wherein the at least one second phase is interconnected within the interconnected matrix of the first phase.

20. The laminated glass article of claim 18, wherein the at least one glass cladding layer is free from alkali ions.

* * * * *